(12) United States Patent
Nebhani et al.

(10) Patent No.: US 9,315,654 B1
(45) Date of Patent: Apr. 19, 2016

(54) PREPARATION OF SILICA REINFORCED RUBBER WITH COUPLING AGENT COMPRISED OF SILOXY TRITHIOCARBONATE AND TIRE WITH COMPONENT

(71) Applicant: The Goodyear Tire & Rubber Company, Akron, OH (US)

(72) Inventors: Leena Nebhani, Copley, OH (US); Tang Hong Wong, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/562,860

(22) Filed: Dec. 8, 2014

(51) Int. Cl.
| | |
|---|---|
| *C08K 5/00* | (2006.01) |
| *C08K 5/16* | (2006.01) |
| *C08K 5/548* | (2006.01) |
| *C08K 3/04* | (2006.01) |
| *C08K 3/36* | (2006.01) |

(52) U.S. Cl.
CPC . *C08K 5/548* (2013.01); *C08K 3/04* (2013.01); *C08K 3/36* (2013.01)

(58) Field of Classification Search
CPC .............. C08K 5/548; C08K 3/36; C08K 3/04
USPC ......................................................... 524/236
See application file for complete search history.

(56) References Cited

U.S. PATENT DOCUMENTS

| | | |
|---|---|---|
| 6,229,036 B1 | 5/2001 | Batz-Sohn et al. |
| 6,579,949 B1 | 6/2003 | Hergenrother et al. |
| 6,608,125 B2 | 8/2003 | Cruse et al. |
| 6,998,452 B1 | 2/2006 | Parker |
| 8,217,103 B2 | 7/2012 | Thiele et al. |
| 8,865,829 B2 | 10/2014 | Nebhani et al. |
| 2015/0025184 A1* | 1/2015 | Du .................. C08L 19/006 524/291 |

* cited by examiner

*Primary Examiner* — Hui Chin
(74) *Attorney, Agent, or Firm* — Henry C. Young, Jr.

(57) ABSTRACT

The present invention relates to preparation of precipitated silica reinforced rubber compositions with silica coupling agent comprised of a siloxy trithiocarbonate, rubber compositions thereof and an article of manufacture such as a tire which contains a component comprised of such rubber composition.

16 Claims, No Drawings

PREPARATION OF SILICA REINFORCED RUBBER WITH COUPLING AGENT COMPRISED OF SILOXY TRITHIOCARBONATE AND TIRE WITH COMPONENT

FIELD OF THE INVENTION

The present invention relates to preparation of precipitated silica reinforced rubber compositions with silica coupling agent comprised of a siloxy trithiocarbonate, rubber compositions thereof and an article of manufacture such as a tire which contains a component comprised of such rubber composition.

BACKGROUND OF THE INVENTION

Rubber compositions, particularly diene elastomer based rubber compositions, are sometimes prepared with particulate reinforcement comprised of precipitated silica which may also include rubber reinforcing carbon black. Such rubber compositions often also contain silica coupling compounds to couple the precipitated silica to diene based elastomers contained in the rubber composition which are sometimes referred to as silica couplers or silica coupling agents. Such silica couplers usually contain a moiety reactive with hydroxyl groups (e.g. silanol groups) contained on the precipitated silica and another different moiety interactive with the diene based elastomers in the rubber composition.

Historically, such silica couplers have been provided as being comprised of, for example, alkoxyorganomercaptosilanes and bis(3-triethoxysilylpropyl) polysulfides having an average of from about 2 to about 4 connecting sulfur atoms in their sulfidic bridge. For the alkoxyorganomercaptosilanes, because, in part, they normally present a particularly high chemical activity with diene based elastomers which, in turn, can lead to rapid viscosity build-up of a rubber composition while being mixed in an internal rubber mixer, various alkoxyorganomercaptosilane coupling agents are often introduced into the rubber composition with their mercapto group being reversibility blocked to thereby render the mercaptosilane latent in a sense of having a significantly reduced, or possibly non-existent, chemical activity until they become unblocked by a chemical deblocking agent, which is usually accomplished while the blocked mercaptosilane is being mixed with the rubber composition.

For this invention, it is proposed to evaluate use of a siloxy trithiocarbonate as a coupling agent, namely as a blocked coupling agent, which can become chemically unblocked by reaction with a primary amine by mixing a combination of the blocked coupling agent with a primary amine compound in the rubber composition.

By such method, an unblocked alkoxymercaptosilane based silica coupling agent is formed within the rubber composition, and it is desired to evaluate coupling the precipitated silica by such unblocked coupling agent to diene based elastomer(s) contained in the rubber composition to promote formation of a precipitated silica reinforced rubber composition.

Historically, siloxy trithiocarbonate has been reported as a free radical polymerization control agent, (U.S. Pat. No. 6,998,452), as well as anionic polymerization chain end terminator, (U.S. Pat. No. 8,865,829). U.S. Pat. Nos. 6,579,949 and 8,217,103 discuss use of molecules based on protected sulfur as anionic polymerization terminating agents. U.S. Pat. Nos. 6,229,036 and 6,608,125 report molecules containing protected sulfur as coupling agents between polymer and filler.

In the description of this invention, the term "phr" where used means "parts of material by weight per 100 parts by weight of rubber". The terms "rubber" and "elastomer" may be used interchangeably unless otherwise indicated. The terms "rubber composition" and "compound" may be used interchangeably unless otherwise indicated.

SUMMARY OF THE INVENTION

In accordance with this invention, a rubber composition is provided comprised of a blend of:

(A) at least one diene-based elastomer, (B) from about 30 to about 160, alternately from about 30 to about 140, phr of a combination of rubber reinforcing carbon black and precipitated silica (synthetic amorphous precipitated silica) comprised of from about 10 to about 150 phr of said precipitated silica, and (C) a blocked silica coupler comprised of a siloxy trithiocarbonate of the general Formula (I):

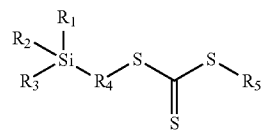

where $R^1$, $R^2$ and $R^3$ are independently selected alkyl or alkoxy groups containing from 1 through 8 carbon atoms provided that at least one of said groups is an ethoxy group, and alternatively provided that all three of said groups are ethoxy groups, $R^4$ is an alkyl group containing from 1 through 8 carbon atoms, $R^5$ is an alkyl, aryl, alkylaryl or arylalkyl group, Si is silicon and S is sulfur, and (D) at least one of primary and/or secondary amine, desirably an aliphatic primary or secondary amine.

Representative of such diene-based elastomers are polymers of at least one of isoprene and 1,3-butadiene and styrene with at least one of isoprene and 1,3-butadiene exclusive of copolymers of isobutylene and diene hydrocarbon.

Representative examples of said diene-based elastomers are, for example, cis 1,4-polyisoprene, polybutadiene (e.g. cis 1,4-polybutradiene), isoprene/butadiene, styrene/isoprene, styrene/butadiene and styrene/isoprene/butadiene elastomers. Minor amounts of 3,4-polyisoprene rubber may be used, if appropriate.

Often desired elastomers for said diene-based elastomers are polybutadiene, styrene/butadiene rubber and cis 1,4-polyisoprene rubber.

In one embodiment of the invention, at least one of said diene-based elastomers, particularly styrene/butadiene rubber, may be a functional elastomer which contains at least one of end-chain and in-chain functional group reactive with hydroxyl groups on said precipitated silica, particularly where said functional groups are comprised of at least one of siloxy, amine, and thiol groups, particularly siloxy and at least one of amine and thiol groups.

An example of such functional elastomer may be, for example, a styrene/butadiene elastomer which contains siloxy groups together with amine or thiol groups.

In one embodiment, the elastomer or functional elastomer may be a tin or silicon coupled elastomer (which thereby increases its molecular weight) which might sometimes be referred to as a star-branched configured elastomer.

In further accordance with the invention a method of preparation of such rubber composition is provided which comprises blending:

(A) at least one of said diene-based elastomers, (B) from about 30 to about 160, alternately from about 30 to about 140, phr of a combination of rubber reinforcing carbon black and precipitated silica (synthetic amorphous precipitated silica) comprised of from about 10 to about 150 phr of said precipitated silica, and (C) a blocked silica coupler comprised of a siloxy trithiocarbonate of the general Formula (I):

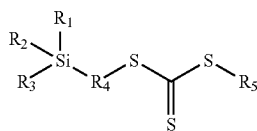

where $R^1$, $R^2$ and $R^3$ are independently selected alkyl or alkoxy groups containing from 1 through 8 carbon atoms provided that at least one of said groups is an ethoxy group, and alternatively provided that all three of said groups are ethoxy groups, $R^4$ is an alkyl group containing from 1 through 8 carbon atoms, $R^5$ is an alkyl, aryl, alkylaryl or arylalkyl group, Si is silicon and S is sulfur, and (D) at least one of primary and/or secondary amine, desirably an aliphatic primary amine.

In additional accordance with the method of this invention, said blocked coupling agent is added to said rubber composition:

(A) prior to addition of said precipitated silica, (B) after addition of said precipitated silica, or (C) substantially simultaneously with addition of said precipitated silica.

In further accordance with this invention, said deblocking agent comprised of at least one of primary and secondary amine, preferably a primary amine, is added to said rubber composition:

(A) after addition of said blocked coupling agent, or (B) substantially simultaneously with said blocked coupling agent.

Representative of said siloxy trithiocarbonate are, for example, S-benzyl-S'-triethoxysilylpropyl trithiocarbonate, S-methylbenzyl-S'-triethoxysilylpropyl trithiocarbonate and S-octyl-S'-triethoxysilylpropyl trithiocarbonate.

Representative of various primary amines (which may be suitable as deblocking agents, or compounds) are, for example and not intended to be limiting, hexylamine, dodecylamine, polyethyleneimine and jeffamine.

Representative of various diene based elastomers are, for example, elastomers comprised of polymers of at least one of isoprene and 1,3-butadiene and polymers of styrene and at least one of isoprene and 1,3-butadiene and are normally not intended to include copolymers of isobutylene and diene hydrocarbon.

The method of the present invention may be conducted, if desired, in the presence of an organic solvent. Suitable solvents which may be used include chloroform, dichloromethane, hexane, heptane, cyclohexane, xylene, tetrahydrofuran and toluene. Representative of normally desirable organic solvents are chloroform, xylene or toluene.

The reaction may be conducted over a variety of ranges of temperatures. Generally, the reaction may be conducted at a temperature ranging from about 20° C. to about 170° C. More desirably, the reaction is conducted at a temperature ranging from about 140° C. to about 170° C. which is a typical temperature range for basic mixing of the rubber composition before mixing with curatives (e.g. sulfur and sulfur vulcanization accelerator) at a lower temperature in a range of, for example, from about 90° C. to about 110° C., as may be appropriate.

The siloxy trithiocarbonate may be added to the rubber by any conventional rubber mixing method such as for example, on open rotating mills or in an internal rubber mixer (e.g. Banbury rubber mixer). The amount of the siloxy trithiocarbonate addition may vary widely depending somewhat upon the level of precipitated silica used as well as the on the selection of diene-based elastomer(s) and intended use of the rubber composition. For example, the siloxy trithiocarbonate might be used, for example, in a range of from about 0.05 to about 15 phr where a range of 0.1 to about 8.0 phr might be more desirable. The siloxy trithiocarbonate is desirably added to the rubber composition in a nonproductive mixing stage and therefore prior to the productive mixing stage with sulfur curatives.

For ease in handling, the siloxy trithiocarbonate may be used per se or may be deposited on suitable carriers, such as for example a carbon black (e.g. a rubber reinforcing carbon black), or silica (e.g. precipitated silica) for introduction to the rubber composition.

The rubber composition should contain a sufficient amount of reinforcing filler (e.g. precipitated silica and rubber reinforcing carbon black) to contribute a reasonably high modulus and high resistance to tear. The reinforcing filler may be added in amounts ranging from, for example, about 10 to about 150 phr. Usually desirably, the reinforcing filler is present in an amount ranging from about 30 to about 120 phr.

The commonly employed siliceous pigments used in rubber compounding applications can be used as the silica in this invention, including pyrogenic and precipitated siliceous pigments (silica) which may include a small amount of aluminosilicate, if desired. The precipitated silica is obtained, for example, by the acidification of a soluble silicate, e.g. to a sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, (1938).

The silica may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is one of several well known means for characterization of silica.

Various commercially available precipitated silicas may be considered for use in this invention such as, for example and not intended to be limitive, silicas commercially available from PPG Industries under the Hi-Sil™ trademark with designations 210, 243, silica available from Solvay with, for example, a designation of Zeosil™ 1165MP and silicas available from Evonik with designations of, for example, VN2 and VN3.

The siloxy trithiocarbonate of Formula I functions as silica coupling agents upon being deblocked as hereinbefore discussed. They may be used alone and/or in combination with additional sulfur containing organosilicon compounds.

Examples of suitable additional sulfur containing organosilicon compounds are, for example, bis(3-trialkoxysilylalkyl) polysulfide containing an average of from about 2 to about 4 connecting sulfur atoms in its polysulfidic bridge (e.g. bis(3-triethoxysilylpropyl) polysulfide) and alkoxyorganomercaptosilane.

It is readily understood by those having skill in the art that the rubber composition would be compounded by methods generally known in the rubber compounding art, such as mixing the various sulfur-vulcanizable constituent rubbers (e.g. diene-based elastomers) with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents where desired. As known to those skilled in the art, depending on the intended use of the sulfur vulcanizable and sulfur vulcanized rubber compositions, the additives mentioned above are selected and commonly used as may be appropriate in conventional amounts.

Typical amounts of reinforcing fillers (e.g. rubber reinforcing carbon blacks and precipitated silica) are have been discussed. Representative examples of sulfur donors include elemental sulfur (free sulfur), an amine disulfide, polymeric polysulfide and sulfur olefin adducts. Desirably, the sulfur vulcanizing agent is elemental sulfur. The sulfur vulcanizing agent may be used in an amount of, for example, ranging from 0.5 to 8 phr, with a range of from 1 to 6 phr being usually desired. Typical amounts of tackifier resins, if used, comprise, for example, about 0.5 to about 10 phr, more usually about 1 to about 5 phr. Typical amounts of processing aids, where used, may comprise about 1 to about 50 phr. Such processing aids can include, for example, aromatic, naphthenic, and/or paraffinic processing oils as may be desired. Typical amounts of antioxidants comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants may comprise, for example, about 1 to 5 phr. Typical amounts of fatty acids, if used, which can comprise at least one of stearic acid, palmitic acid and oleic acid, may comprise, for example, about 0.5 to about 5 phr. Typical amounts of zinc oxide may comprise, for example, about 2 to about 5 phr. Typical amounts of waxes, if used, may comprise, for example, about 1 to about 5 phr. Often such waxes are microcrystalline waxes. Typical amounts of peptizers, if used, may comprise for example about 0.1 to about 1 phr. Typical peptizers may be, for example, pentachlorothiophenol and dibenzamidodiphenyl disulfide.

In one aspect of the present invention, the sulfur vulcanizable rubber composition is sulfur-cured or vulcanized.

Accelerators are used to control the time and/or temperature required for vulcanization and to improve the properties of the vulcanizate. In one embodiment, a single accelerator system may be used, i.e. primary accelerator. The primary accelerator(s) may be used, for example, in total amounts ranging from about 0.5 to about 4, usually desirably from about 0.8 to about 1.5, phr. In another embodiment, combinations of a primary and a secondary accelerator might be used with the secondary accelerator being used in amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are, for example, various amines, disulfides, guanidines, thioureas, thiazoles, thiurams, sulfenamides, dithiocarbamates and xanthates. Desirably, the primary accelerator is usually a sulfenamide. If a second accelerator is used, the secondary accelerator is often desirably a guanidine, dithiocarbamate or thiuram compound.

The mixing of the rubber composition can be accomplished by methods known to those having skill in the rubber mixing art. For example, the ingredients are typically mixed in at least two stages, namely at least one sequential non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

In such manner, then the siloxy trithiocarbonate, which yields an asymmetrical sulfur containing compound upon being deblocked, could be utilized for reaction with the precipitated silica and sulfur vulcanizable elastomer and the independent later addition of the sulfur donor, particularly a free sulfur source, could be primarily relied upon for the vulcanization of the elastomer. In addition, with certain derivatives of siloxy trithiocarbonate coupling agent, a fragment containing long alkyl chain could be generated which can help in processability of the rubber composition.

If desired, the silica coupler may be pre-reacted with the precipitated silica to form a composite thereof before addition to the rubber composition.

The invention further contemplates a vulcanized rubber composition prepared by such process.

The invention additionally contemplates a vulcanized tire containing a component prepared by such process.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

For example, a tire may be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The following Examples are provided to illustrate the invention and are not intended to limit the scope in which it can be practiced. Unless otherwise indicated, parts and percentages are by weight.

EXAMPLE I

Synthesis (1) of Siloxy Trithiocarbonate (STTC)

A synthesis of siloxy trithiocarbonate is provided for STTC containing a benzyl group using sodium ethoxide as a base.

To a stirred solution of 3-(mercaptopropyl) triethoxysilane (30 mol) in 50 mL of anhydrous ethanol was added dropwise a solution of sodium ethoxide in ethanol (21 weight percent) in ethanol (30 mmol). After stirring for about one hour at ambient temperature, carbon disulfide (40 mmol) was added dropwise to the solution and the mixture stirred for about five hours. To the yellow colored solution was added benzyl bromide (30.9 mmol) and the mixture stirred overnight at ambient temperature. The mixture was then filtered off, concentrated under reduced pressure, followed by a second filtration using a disposable filter funnel. The product was obtained in 90 percent yield. The purity of synthesized compound was determined via 1H-HMR and 29Si-NMR.

EXAMPLE II

Synthesis (2) of Siloxy Trithiocarbonate (STTC)

A synthesis of siloxy trithiocarbonate is provided for STTC containing a benzyl group using triethylamine as a base.

To a stirred solution of 3-(mercaptopropyl) triethoxysilane (30 mol) in 60 mL of anhydrous tetrahydrofuran was added carbon disulfide (150 mmol) followed by an addition of triethylamine (45 mmol). The reaction was stirred for 20 minutes at ambient temperature followed by addition of benzyl bromide (30 mmol). After the addition of the benzyl bromide the reaction mixture was stirred at ambient temperature for about five hours. The mixture was then filtered off, concentrated under reduced pressure, followed by a second filtration using a disposable filter funnel. The product was obtained in 95 percent yield. The purity of synthesized compound was determined via 1H-HMR.

EXAMPLE III

Synthesis (3) of Siloxy Trithiocarbonate (STTC)

A synthesis of siloxy trithiocarbonate is provided for STTC containing a 4-methyl benzyl group using triethylamine as a base.

To a stirred solution of 3-(mercaptopropyl) triethoxysilane (30 mol) in 60 mL of anhydrous tetrahydrofuran was added carbon disulfide (150 mmol) followed by an addition of triethylamine (45 mmol). The reaction was stirred for 20 minutes at ambient temperature followed by addition of 4-methyl benzyl bromide (30 mmol). After the addition of the 4-methyl benzyl bromide the reaction mixture was stirred at ambient temperature for about five hours. The mixture was then filtered off, concentrated under reduced pressure, followed by a second filtration using a disposable filter funnel. The product was obtained in 90 percent yield. The purity of synthesized compound was determined via 1H-HMR.

EXAMPLE IV

Synthesis (4) of Siloxy Trithiocarbonate (STTC)

A synthesis of siloxy trithiocarbonate is provided for STTC containing an octyl group using triethylamine as a base.

To a stirred solution of 3-(mercaptopropyl) triethoxysilane (30 mol) in 60 mL of anhydrous tetrahydrofuran was added carbon disulfide (150 mmol) followed by an addition of triethylamine (45 mmol). The reaction was stirred for 20 minutes at ambient temperature followed by addition of 1-bromooctane (36 mmol). After the addition of the 1-bromooctane, the reaction mixture was stirred at 50° C. for about five hours. The mixture was then filtered off, concentrated under reduced pressure, followed by a second filtration using a disposable filter funnel. The excess of 1-bromooctane was removed by Kugelrohr (120° C., 6 mbar). The product was obtained in 85 percent yield. The purity of synthesized compound was determined via 1H-HMR.

EXAMPLE V

Deblocking of STTC with Primary Amine

A deblocking of the trithiocarbonate group of a benzyl containing STTC (illustrated Example I) with a primary amine.

It is understood that trithiocarbonate groups, in general, are highly unstable in the presence of a primary amine (e.g. see the recitation: X.-P. Qiu and F. M. Winnik, *Macromol. Rapid Commun.* 2006, 27, 1648 and X. P. Qiu and F. W. Winnik, Macromolecules 2007, 40, 872).

It is therefore considered to be appropriate to evaluate treating the STTC with a primary amine to unblock the STTC to thereby yield and make available the desirable thiol group so that the deblocked STTC may be suitable as a coupling agent for a precipitated silica in a rubber composition containing a diene-based elastomer. (as previously indicated, such primary amines may be, for example and not intended to be limiting, one or more of hexylamine, dodecylamine, polyethyleneimine and jeffamine).

A benzyl STTC, exemplary of which is provided in Example I), is blended with a polyethyleneimine (branched, with a number average molecular weight (Mn) of about 10,000 g/mol and weight average molecular weight (Mw) of about 25,000 g/mol). From NMR analysis (1H-NMR) it was determined that the trithiocarbonate was completely deblocked.

For this experiment, the benzyl containing STTC (0.247 mmol) and polyethyleneimine (0.0247 mmol) were refluxed in 5 mL of toluene-d8 for 30 minutes. Thereafter, the material (product) was analyzed via NMR (1H-NMR) to evaluate the deblocking of the trithiocarbonate group.

EXAMPLE VI

Preparation of Silica Reinforced Rubber

A precipitated silica-containing rubber composition is prepared to evaluate coupling of the precipitated silica with a diene-based elastomer-containing rubber composition by an inclusion of siloxy trithiocarbonate and primary amine deblocking compound for the siloxy trithiocarbonate to thereby form a mercaptoorganosilane based silica coupling agent and its associated coupling of the precipitated silica to the diene-based elastomers in situ within the rubber composition.

For this Example, an octyl based siloxy trithiocarbonate was used as illustrated in the preceding Example IV.

For this Example, rubber Samples A and B were prepared.

Rubber Sample A is a control rubber sample with an siloxy trithiocarbonate which contained an octyl group, without a primary amine addition.

Experimental Rubber Sample B is an experimental rubber sample which contains an inclusion of a siloxy trithiocarbonate which contained an octyl group and a primary amine.

The basic rubber composition (amounts rounded) for this Example is reported in the following Table 1 with parts and percentages, where appropriate, by weight unless otherwise indicated. For example, various amounts of ingredients may be reported in terms of parts by weight per 100 parts by weight rubber (phr).

TABLE 1

| Material | Parts by weight (phr) |
|---|---|
| Non-productive mixing | |
| Styrene/butadiene rubber[1] | 100 |
| Precipitated silica[2] | 65 |
| Siloxy trithiocarbonate | 5.2 |
| Primary amine[3] | 0 and 0.4 |
| Fatty and organic acids[4] | 3.2 |
| Rubber processing oil | 11 |
| Productive mixing (subsequent to non-productive mixing) | |
| Sulfur | 1.6 |
| Sulfur cure accelerators[5] | 3.1 |
| Antioxidant[6] | 0.8 |
| Zinc oxide | 2 |

[1]Styrene/butadiene rubber containing about 21 percent bound styrene prepared by anionic polymerization of styrene and 1,3-butadiene monomer
[2]Precipitated silica as Zeosil 1165 MP ™ from Solvay
[3]Primary amine deblocking compound such as polyethyleneimine
[4]Fatty acid comprised of stearic acid, palmitic acid and oleic acid and organic acids comprised of benzoic and salicyclic acids.
[5]Sulfur cure accelerators comprised of sulfenamide and diphenyl guanidine
[6]Amine based antioxidant (a secondary amine)

The rubber compositions were prepared by blending the ingredients in an internal rubber mixer in a series of sequential mixing steps while sheeting out the rubber mixtures and cooling to a temperature below 40° C. between mixing steps. The sequential mixing steps were comprised of a non-productive mixing step(s) with a drop temperature of about 160° C. (temperature of removal of the rubber from the internal rubber mixer) (NP), followed by a productive mixing step (P) with a drop temperature of about 110° C., (in which sulfur and sulfur cure accelerators were added).

Such sequential mixing steps are well known to those having skill in such art.

The following Table 2 reports cure behavior and various physical properties of Control rubber Sample A and Experimental rubber Sample B upon the formulation illustrated in of Table 1. The rubber samples were sulfur cured, where appropriate, for about 15 minutes at about 160° C.

TABLE 2

| | Control A | Experimental Rubber Sample B |
|---|---|---|
| Styrene/butadiene rubber (phr) | 100 | 100 |
| Siloxy trithiocarbonate (phr) | 5.2 | 5.2 |
| Primary amine (phr) | 0 | 0.4 |
| Cured Properties (60 minutes at 150° C.) | | |
| Maximum torque (dNm) | 24 | 17 |
| Minimum torque (dNm) | 4 | 4 |
| Delta torque (dNm) | 20 | 14 |
| RPA[1] | | |
| Storage modulus (G'), 1% strain, 11 Hertz, 100° C., kPa | 3622 | 2105 |
| Storage modulus (G'), 10% strain, 11 Hertz, 100° C., kPa | 2166 | 1588 |
| Uncured storage modulus (G'), 0.833 Hertz, 100° C., kPa | 414 | 402 |
| Tan delta (5% strain, 100° C.) | 0.12 | 0.11 |

[1]Rubber Process Analyzer (RPA) test

From Table 2 it is observed that the Experimental rubber Sample B shows lower tan delta value (0.11) than the tan delta value (0.12) of the Control rubber Sample A. Further, the G' at 1 percent strain (indicative of Payne Effect) value of 2105 kPa for Experimental rubber Sample B is also lower than the G' at 1 percent strain value of 3622 kPa for Control rubber Sample A. Such combination of the Tan delta and Payne effect values is indicative of better dispersion of the precipitated silica within the rubber composition.

Note: The Payne effect is a nonlinear dynamic mechanical property of reinforcing filler-containing elastomers. The Payne effect was first studied and reported by A. R. Payne, *J. Appl. Polym. Sci.* 6. 57 through 63 (1962). The Payne effect is an effect generally associated with the breakdown and agglomeration of filler particles contained in a rubber composition. For example, increased filler dispersion in a rubber composition (generally a beneficial and desirable effect) reduces the Payne effect may be a measure, or an indication of a reduction in measured dynamic modulus of a filler reinforced rubber composition at low strain (for example G' at a 1 percent dynamic strain). Such Payne effect is well known to those having skill in such art.

In addition, the uncured Experimental rubber Sample B exhibited better processing of with an uncured storage modulus G' of 402 kPa as compared to a higher uncured storage modulus G' of 414 kPa for the uncured rubber composition of Control rubber Sample A. Further, the relatively long chain feature of the derivative of the siloxytrithiocarbonate may assist in promoting better processing of the rubber composition.

While the entire mechanism may not be fully understood, it appears that the presence of the siloxy groups (ethoxy groups) helped to promote covalent interaction with hydroxyl groups (e.g. silanol groups) on the surface of the precipitated silica while the trithiocarbonate group, when deblocked by the added primary amine helped to make the now available mercapto group interact with the diene-based elastomer (the styrene/butadiene rubber) contained in the rubber composition.

While it is appreciated that the added primary amine may possibly also tend to react with hydroxyl groups on the precipitated silica by hydrogen bonding, it is considered that such possible hydrogen bonding interaction is much weaker than covalent interactive bonding by the derivative of the siloxy trithiocarbonate.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of a blend of:
    (A) at least one diene-based elastomer comprised of at least one of cis 1,4-polyisoprene, polybutadiene, isoprene/butadiene, styrene/isoprene, styrene/butadiene and styrene/isoprene/butadiene elastomers exclusive of copolymers of isobutylene and diene hydrocarbon,
    (B) from about 30 to about 160 phr of a combination of rubber reinforcing carbon black and precipitated silica comprised of from about 10 to about 150 phr of said precipitated silica, and
    (C) a blocked silica coupler comprised of a siloxy trithiocarbonate of the general Formula (I):

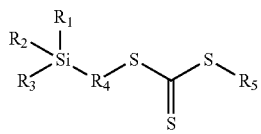

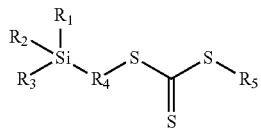

where $R_1$, $R_2$ and $R_3$ are independently selected alkyl or alkoxy groups containing from 1 through 8 carbon atoms provided that at least one of said groups is an ethoxy group, $R_4$ is an alkyl group containing from 1 through 8 carbon atoms, $R_5$ is an alkyl, aryl, alkylaryl or arylalkyl group, Si is silicon and S is sulfur, and (D) at least one aliphatic primary amine.

2. The rubber composition of claim 1 wherein at least one of said diene-based elastomers is tin or silicon coupled.

3. The rubber composition of claim 1 where at least one of said elastomers is a functional styrene/butadiene elastomer which contains at least one of end-chain and in-chain functional group reactive with hydroxyl groups on said precipitated silica, where said functional groups are comprised of siloxy and at least one of amine and thiol groups.

4. The rubber composition of claim 3 wherein said styrene/butadiene elastomer is tin or silicone coupled.

5. The rubber composition of claim 1 wherein said primary amine is comprised of at least one of hexylamine, dodecylamine, and polyethyleneimine.

6. The rubber composition of claim 1 wherein said siloxy trithiocarbonate is comprised of at least one of S-benzyl-S'-triethoxysilylpropyl trithiocarbonate, S-methylbenzyl-S'-triethoxysilylpropyl trithiocarbonate and S-octyl-S'-triethoxysilylpropyl trithiocarbonate.

7. A method for preparation of a rubber composition which comprises blending:

(A) at least one diene-based elastomer comprised of at least one of cis 1,4-polyisoprene, polybutadiene, isoprene/butadiene, styrene/isoprene, styrene/butadiene and styrene/isoprene/butadiene elastomers exclusive of copolymers of isobutylene and diene hydrocarbon, (B) from about 30 to about 160 phr of a combination of rubber reinforcing carbon black and precipitated silica comprised of from about 100 to about 150 phr of said precipitated silica, and (C) a blocked silica coupler comprised of a siloxy trithiocarbonate of the general Formula (I):

where $R_1$, $R_2$ and $R_3$ are independently selected alkyl or alkoxy groups containing from 1 through 8 carbon atoms provided that at least one of said groups is an ethoxy group, $R_4$ is an alkyl group containing from 1 through 8 carbon atoms, $R_5$ is an alkyl, aryl, alkylaryl or arylalkyl group, Si is silicon and S is sulfur, and (D) an aliphatic primary amine.

8. The method of claim 7 wherein
at least one of said diene-based elastomers is a functional styrene/butadiene elastomer which contains at least one of end-chain and in-chain functional group reactive with hydroxyl groups on said precipitated silica, where said functional groups are comprised of at least one of siloxy, amine and thiol groups.

9. The method of claim 8 wherein said functionalized styrene/butadiene elastomer is a tin or silicon coupled functionalized styrene/butadiene elastomer.

10. The method of claim 7 wherein said siloxy trithiocarbonate is added to said rubber composition:

(A) prior to addition of said precipitated silica,
(B) after addition of said precipitated silica, or
(C) simultaneously with addition of said precipitated silica.

11. The method of claim 7 wherein said primary amine is added to said rubber composition:

(A) after addition of said siloxy trithiocarbonate, or
(B) simultaneously with said siloxy trithiocarbonate.

12. The method of claim 7 wherein said primary amine is comprised of at least one of hexylamine, dodecylamine, and polyethyleneimine.

13. The method of claim 7 wherein said siloxy trithiocarbonate is comprised of at least one of S-benzyl-S'-triethoxysilylpropyl trithiocarbonate, S-methylbenzyl-S'-triethoxysilylpropyl trithiocarbonate and S-octyl-S'-triethoxysilylpropyl trithiocarbonate.

14. A rubber composition prepared by the method of claim 7.

15. A tire having a component of a rubber composition comprised of the rubber composition of claim 1.

16. A tire having a component of a rubber composition comprised of the rubber composition prepared by the method of claim 7.

\* \* \* \* \*